United States Patent [19]

Heuvel

[11] 4,193,568

[45] Mar. 18, 1980

[54] DISC-TYPE AIRBORNE VEHICLE AND RADIAL FLOW GAS TURBINE ENGINE USED THEREIN

[76] Inventor: Norman L. Heuvel, 14723 SE. 263rd, Kent, Wash. 98031

[21] Appl. No.: 842,673

[22] Filed: Oct. 17, 1977

Related U.S. Application Data

[63] Continuation-in-part of Ser. No. 702,523, Jul. 6, 1976, abandoned.

[51] Int. Cl.$^2$ .......................... B64C 29/04; F02C 3/14
[52] U.S. Cl. ................ 244/23 C; 60/39.16 C; 60/39.3 S; 60/39.36; 244/53 R
[58] Field of Search ............ 244/7 R, 53 R, 12.1, 244/12.2, 23 R, 23 C; 60/39.34, 39.35, 39.16 C, 39.16 SI, 201, 268; 416/64, 194, 21

[56] References Cited

U.S. PATENT DOCUMENTS

| | | | |
|---|---|---|---|
| 1,868,143 | 7/1932 | Heinze | 60/39.3 |
| 2,448,972 | 9/1948 | Gizara | 60/39.35 |
| 2,508,673 | 5/1950 | Guthier | 416/21 |
| 2,628,473 | 2/1953 | Frye | 60/39.35 |
| 2,718,364 | 9/1955 | Crabtree | 244/12 C |
| 2,836,958 | 6/1958 | Ward | 60/39.35 |
| 2,850,250 | 9/1958 | Smith | 244/7 R |
| 2,927,746 | 3/1960 | Mellen | 244/12 C |
| 2,973,166 | 2/1961 | Stahmer | . |
| 2,997,254 | 8/1961 | Mulgrave et al. | 244/12 C |
| 3,018,068 | 1/1962 | Frost et al. | . |
| 3,020,003 | 2/1962 | Frost et al. | 244/23 C |
| 3,045,951 | 7/1962 | Freeland | 244/23 C |
| 3,276,723 | 10/1966 | Miller et al. | 244/23 C |
| 3,395,876 | 8/1968 | Green | . |
| 3,519,224 | 7/1970 | Boyd et al. | 244/23 R |
| 3,568,955 | 3/1971 | McDevitt | 244/23 C |
| 3,699,771 | 10/1972 | Chelminiski | 416/21 |
| 3,727,401 | 4/1973 | Fincher | 60/39.16 C |
| 3,774,865 | 11/1973 | Pinto | 244/23 C |
| 3,838,835 | 10/1974 | Kling | 244/23 C |

FOREIGN PATENT DOCUMENTS

| | | | |
|---|---|---|---|
| 523055 | 3/1956 | Canada | 60/39.35 |
| 678700 | 1/1964 | Canada | . |
| 787245 | 6/1968 | Canada | . |

*Primary Examiner*—Galen L. Barefoot
*Attorney, Agent, or Firm*—Graybeal & Uhlir

[57] ABSTRACT

An annular, radial flow gas turbine engine and airborne vehicle utilizing same for jet propulsion. The engine comprises counter-rotating rotors and a compressor section with counter-rotating annular rows of intermeshing compressor blades, an annular combustion section common to both rotors wherein the combustion zone is defined by oppositely rotating rotor walls, and a turbine section made up of annular rows of counter-rotating exhaust turbine blades. No stator blades are present in either the compressor or the turbine sections. The craft comprises a central hub on which the engine rotors rotate on thrust bearings, and air bearings maintain rotor tolerances with respect to each other and to nonrotating shell portions above and below the engine rotors. Air inlet guide vanes leading to the compressor section are also housed in the hub portion of the craft. Exhaust gases emitting from the turbine section are selectively ducted through annularly arranged, downwardly directed lift thrust producing ducts and/or rearwardly directed ducts or vanes for generation of forward propulsion. Directional control during hovering and low speed flight is by selective braking of one or the other of the rotors, and during high speed flight also by selective control of spoiler surfaces arranged in the upper and lower external surfaces of the craft.

27 Claims, 8 Drawing Figures

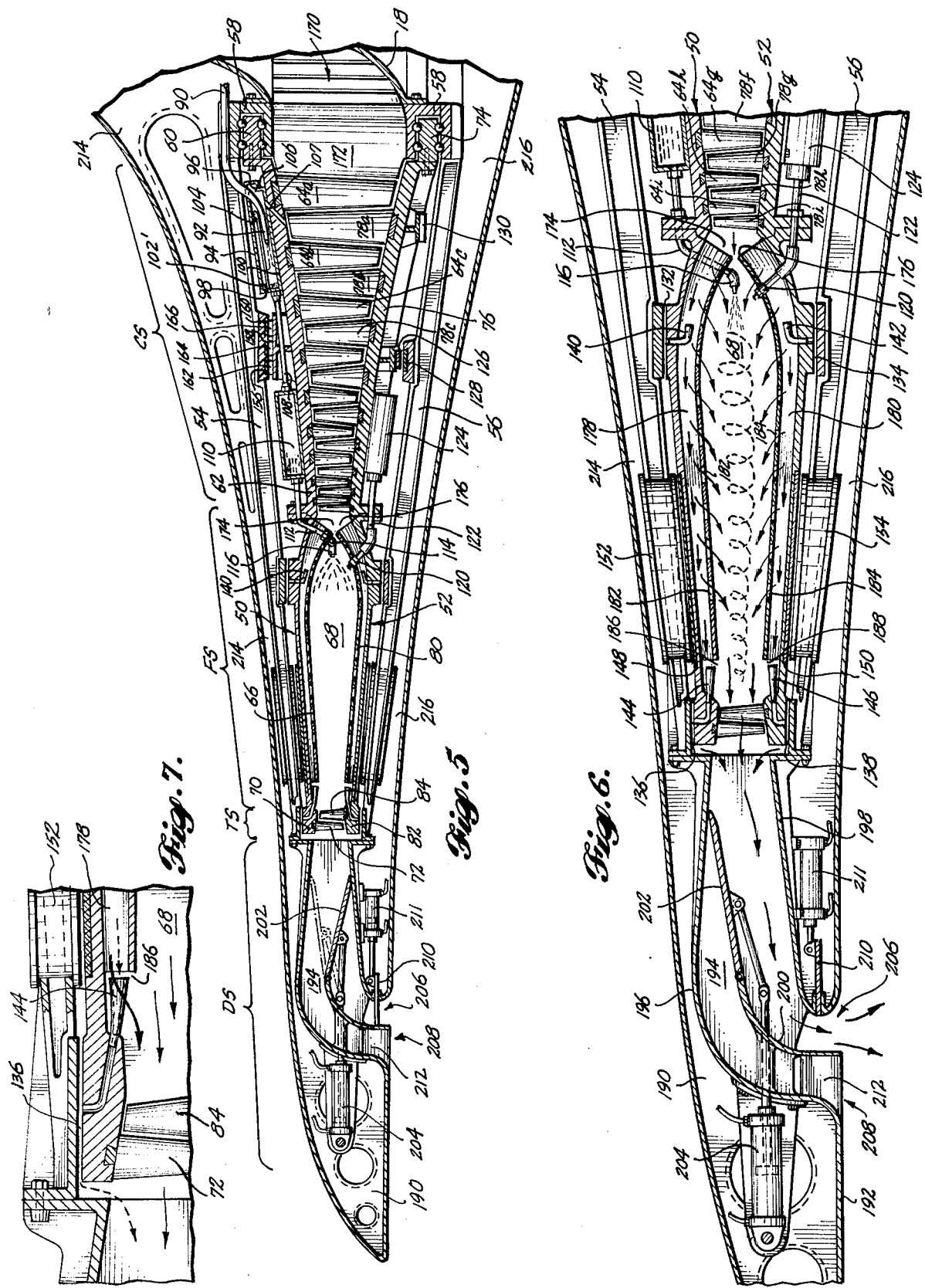

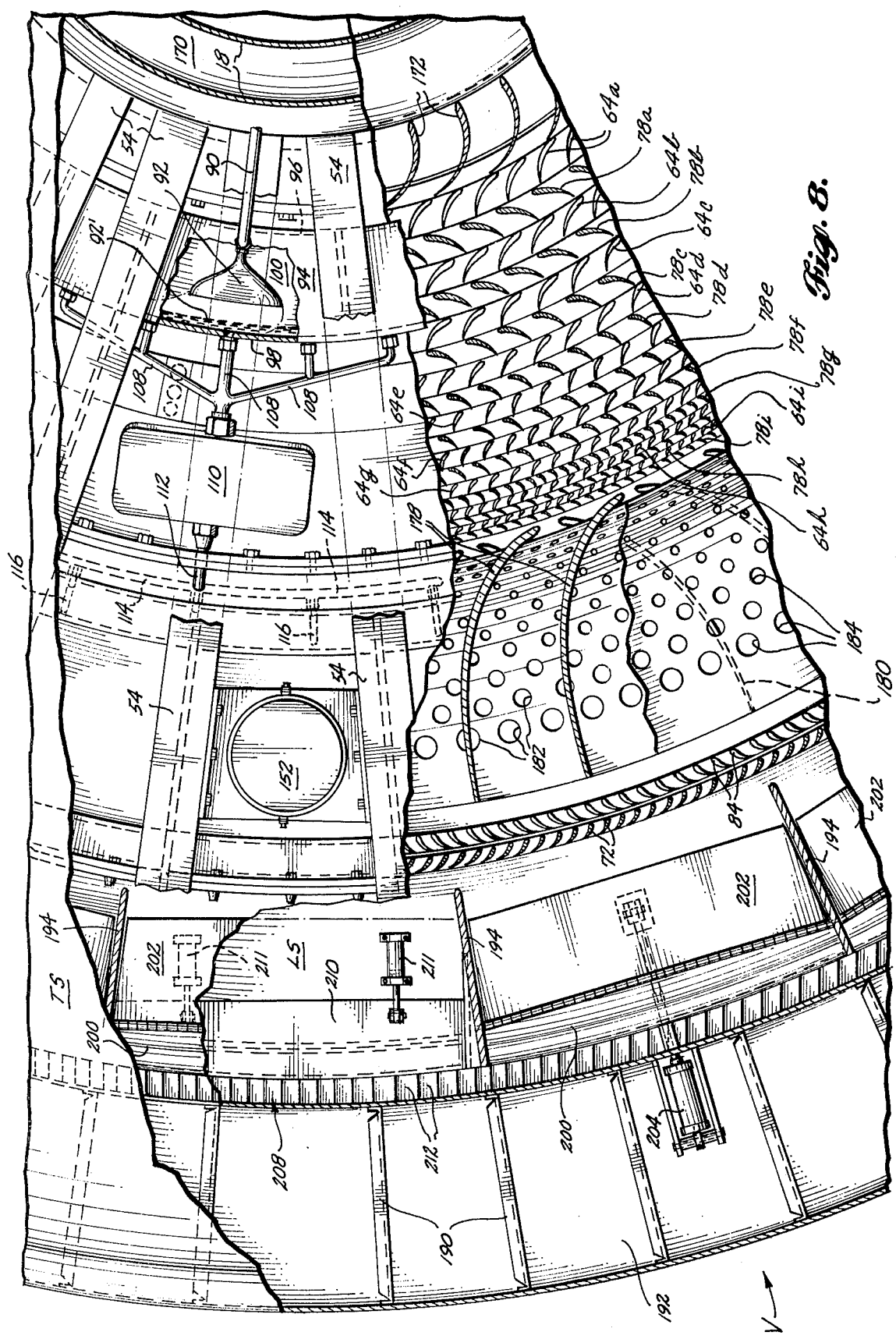

DISC-TYPE AIRBORNE VEHICLE AND RADIAL FLOW GAS TURBINE ENGINE USED THEREIN

CROSS REFERENCE TO RELATED APPLICATION

This is a continuation-in-part of application Ser. No. 702,523, filed July 6, 1976, now abandoned.

BACKGROUND OF THE INVENTION

1. Field of the Invention

This invention relates to an annular radial flow gas turbine engine and a disc type airborne vehicle employing same in conjunction with thrust and aerodynamic surface control means enabling the vehicle to take off and land vertically, to hover and to engage in both low speed and high speed aerodynamic flight.

2. Description of the Prior Art

The broad concept of an aircraft powered by a radial flow gas turbine engine is old, such as disclosed in Smith U.S. Pat. No. 2,850,250. In the engine disclosed by Smith, an internal set of stator blades is required for the compressor and turbine sections which adds weight to and unduly complicates the engine. Air input to the first stage of the compressor is restricted due to a plurality of conduits or openings of somewhat smaller diameter than the opening to the compressor. This feature together with the counter-rotational rotor blades creates a noncontinuous flow of air to the compressor input. Also, the Smith engine employs a plurality of so-called "can type combustion chambers" of relatively limited volumetric capacity per given weight and which of themselves simply house the combusting products, i.e. contribute no turbulence or mixing effect to the fuel air mixture or combusting products. It is also a disadvantage of the engine and aircraft arrangement disclosed by Smith that the products of combustion emitting from the annular array of combustion chambers are simply ducted in essentially only one direction from the craft.

Heinze U.S. Pat. No. 1,868,143 discloses a turbine engine utilizing a premixture of fuel and air for communication to a compressor comprising counter-rotational blades. This premixture is drawn into the compressor through an input chamber of relatively small diameter by a hollow rotating shaft having a plurality of holes at one end. As in the Smith patent, this feature creates a noncontinuous flow of premixed fuel and air to the compressor input. Heinze also teaches the use of a rectangular shape combustion chamber with a capacity of at least three times that of an input chamber in communication therewith prior to compression. This configuration has inherent safety and operational disadvantages in that Heinze discloses the compression of a potentially explosive fuel air mixture while providing a combustion chamber of a geometric shape insufficient to sustain combustion.

Frost et al Canadian Pat. Nos. 683,142 and 787,245 present essentially identical disclosures of disc type aircraft with essentially identical radial flow gas turbine engine propulsion systems. In the Frost et al propulsion systems the engines also require compressor and exhaust stator blading and also employ stationary can type combustion chambers with the same disadvantages as discussed above with respect to Smith. A further and significant disadvantage of the Frost et al engine is its use of a single rotating compressor and turbine element interfacing with corresponding stator elements in contrast to use of counter-rotating elements in the manner characteristic of the present invention. A single rotating compressor and turbine element result in excessive torque and the direction of the rotor rotation and also causes large gyroscopic precessional forces presenting serious design and operational complication in the practical use of this type of engine. Further, although Frost et al discloses the use of air bearings to support radial and axial loads, the Frost et al engine provides no conventional mechanical bearings for support of the rotor portions of the engine during engine start-up and shutdown and during other engine operating conditions when air bearings alone do not entirely satisfy required engine tolerances.

Mulgrave et al U.S. Pat. No. 2,997,254 discloses the use of lift means annularly disposed beneath a vehicle. Forward propulsion of the vehicle is provided by a plurality of panels sequentially disposed about the upper surface of the vehicle. Although Mulgrave teaches the use of the propulsion in the forward direction by ducting a portion of the exhaust gases, such propulsion is not accomplished by a continuous annular ducting means generally disposed peripherally around the underside of the vehicle.

Freeland U.S. Pat. No. 3,045,951 shows a propulsion ducting system which appears to be continuous but is on the horizontal side of a vehicle and is not disposed peripherally beneath the vehicle.

McDevitt U.S. Pat. No. 3,568,955 although showing annular propulsion means disposed beneath a vehicle, does not teach the use of a continuous annulus of forward propulsion. In McDevitt, forward propulsion is provided by four dampers located at opposite ends of the vehicle.

Finally, viturally all aircraft gas turbine engines in present use are of the axial flow type providing only point thrust axially of a jet nozzle and aircraft using this type of engine must be designed accordingly. While axial flow gas turbine engines have been used for propulsion purposes in a few prototype vertical take-off and landing vehicles, the design limitations dictated by the inherent point thrust of the axial flow type engine necessitates extensive exhaust ducting and control features with the result that these vehicles have met with only modest overall success.

SUMMARY OF THE INVENTION

Radial flow jet engines according to the present invention receive air at a central cylindrical hub section and compress the air in an outward, radial direction under action of two counter-rotating, generally symmetrical rotors made up of a plurality of alternating, intermeshed rotor blades. The air thus compressed is delivered in radial flow into the combustion chamber through holes interspersed in the combustion chamber walls, with air turbulating vanes being also provided in the air flow path into the combustion chamber to aid in cooling the combustion chamber walls. Fuel is injected into the combustion zone and is continuously burned with the air to add velocity or kinetic energy to the air mass. Energy is extracted from the products of combustion by reaction thereof with counter-rotating turbine blades in the turbine section, with a portion of the energy thus extracted being used to drive the compressor section, and the remaining portion of the energy being utilized as jet thrust through annular exhaust outlets arranged generally peripherally of the craft to provide what may be termed "area" thrust, as distinguished from the "point" thrust characteristic of thrust systems used with axial flow jet engines.

The jet thrust system used in airborne vehicles according to the present invention comprises an annular array of lift thrust producing ducts, each occupying a sector of the craft, and also an annular array of forward propulsion thrust generating ducts or vanes, both of which arrays of thrust producing devices are arranged generally peripherally of the lower surface of the craft near the edge thereof. As will be apparent, such thrust ducts, acting in concert, effectively provide thrust over a substantial "area", as distinguished from one or more "point" thrust producing devices of the axial exhaust nozzle type, and inherently provide a more stabilized craft attitude during flight.

No stator blading is present or required in either the compressor or turbine sections of the engine, with the result that the net torque of the engine is nominally zero in that all rotating engine elements are essentially equal and oppositely reacting. The essentially symmetrical nature of the opposed rotor elements of the engine, particularly with regard to the opposed turbulating vanes in the combustion section, provide favorable air flow characteristics in terms of improved cooling and enhanced combustion efficiency.

It is a significant feature and advantage of the airborne vehicle of the present invention that the engine rotor elements, and particularly the counter-rotating compressor blades and thrust blades thereof, rotate at radii of relatively great length, i.e. several feet. As a consequence, for any given rotational speed desired (in terms of lineal feet per second), the revolutions per minute (rpm) of the rotor elements is relatively quite low so that much lower centrifugal forces are developed. Stated otherwise, the relatively high rpm characteristically needed for axial flow jet engines in order to develop a given amount of gas flow and thrust is not necessary in radial flow engine according to the present invention. As a further and somewhat related advantage and feature, the annular, continuous configuration of the combustion chamber defined by the oppositely rotating combustion chamber wall portions of the rotor elements of the engine presented inherently provides a relatively large combustion chamber volume for a given engine weight, as compared with the weight and relative complexity of a comparable propulsion system involving a plurality of can-type combustion chambers of like total volume.

Additional features and advantages of jet engines and airborne vehicles incorporating same according to the invention will be apparent from the following description of a typical, illustrative embodiment thereof.

BRIEF DESCRIPTION OF THE DRAWINGS

FIG. 5 is an enlarged radial section view of a portion of the engine of said aircraft, taken substantially on a line perpendicular to the forward direction of flight, i.e. taken substantially along the cutaway portion shown in FIG. 3;

FIG. 6 is a further radial sectional view on a larger scale of certain parts of the engine and thrust control components shown in FIG. 5;

FIG. 7 is a fragmentary, sectional view on a further enlarged scale of certain parts of the engine shown in FIG. 6, particularly in the portion thereof at the downstream end of the combustion section FS and the thrust section TS; and FIG. 8 is a top, fragmentary view with various parts broken away and shown in section, further illustrating the structure and internal detail of the engine and thrust control components associated therewith.

DESCRIPTION OF THE PREFERRED EMBODIMENT

Figure 1:
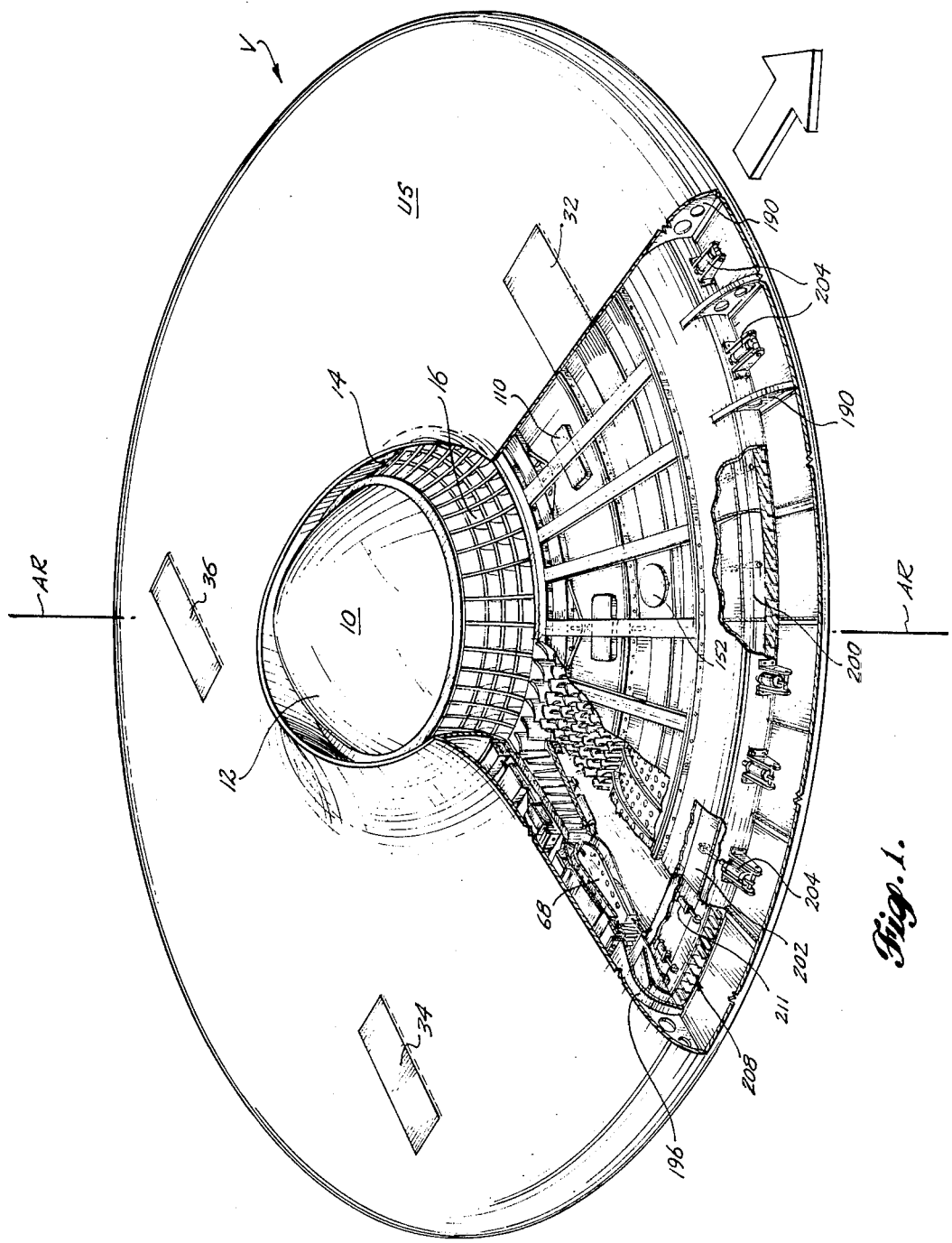
FIG. 1 is a top perspective view of a disc-type aircraft embodying the invention, with various parts broken away to further show the constructional detail of certain portions thereof.
Figure 2:
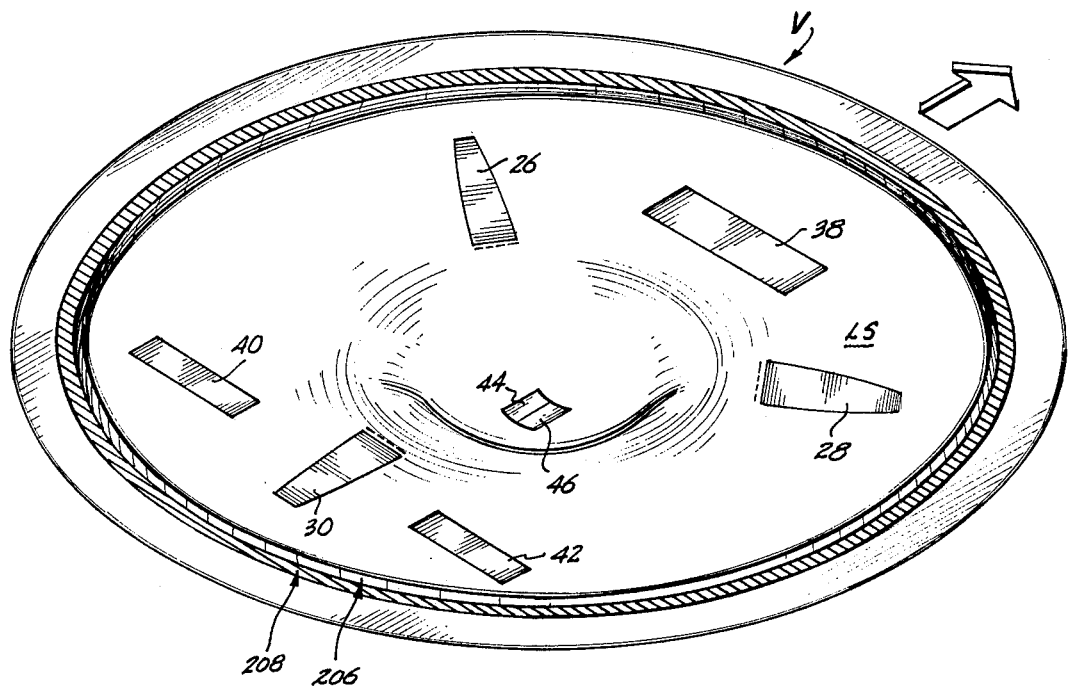
FIG. 2 is a bottom perspective view of said aircraft in flight attitude.

In general, the disc-type airborne vehicle V shown in FIGS. 1–4 comprises a central section C surrounded by an annular, radial flow jet engine generally designated E and an annular thrust control duct section generally designated D, the external shell of the vehicle being made up of respective upper and lower aerodynamic surfaces generally designated US and LS, with suitable landing gear, generally designated LG, incorporated in the latter. The central section C is functionally, in relation to the engine E, a relatively stationary central hub and includes a cockpit area 10 for the occupant(s) and controls (not shown). The cockpit area 10 is enclosed by a transparent or translucent canopy 12, the configuration of the craft upper surface US around the cockpit area 10 being such that an annular air intake plenum 14 is provided in a generally forwardly open configuration (note FIGS. 3 and 4) to provide ram air ingress into the engine E during cruising flight, the incoming air moving into the plenum 14 and through cascade deflection vanes 16 in the forward portion of the plenum, and annular ducting 18 (also note FIGS. 5 and 6) to the air intake area of the engine E. Central section C also houses wheel well 20 into which landing wheel 22 retracts, and fuel storage tank means 24, as well as appropriate miscellaneous accessory equipment (not shown). In addition to the landing wheel 22, the landing gear LG comprises retractable ground engaging stabilizer panels 26, 28, 30 which, when retracted, form part of the aerodynamic lower surface LS (FIG. 2). Both the upper aerodynamic surface US and lower dynamic surface LS include respective aerodynamic spoiler and control surface panels 32, 34, 36 and 38, 40, 42 for attitude control during flight, in a manner conventional per se. As shown in FIG. 2, wheel well 20 is provided with cover panels or doors 44, 46 maintained in closed position when the landing wheel 22 is retracted.

Figure 3:
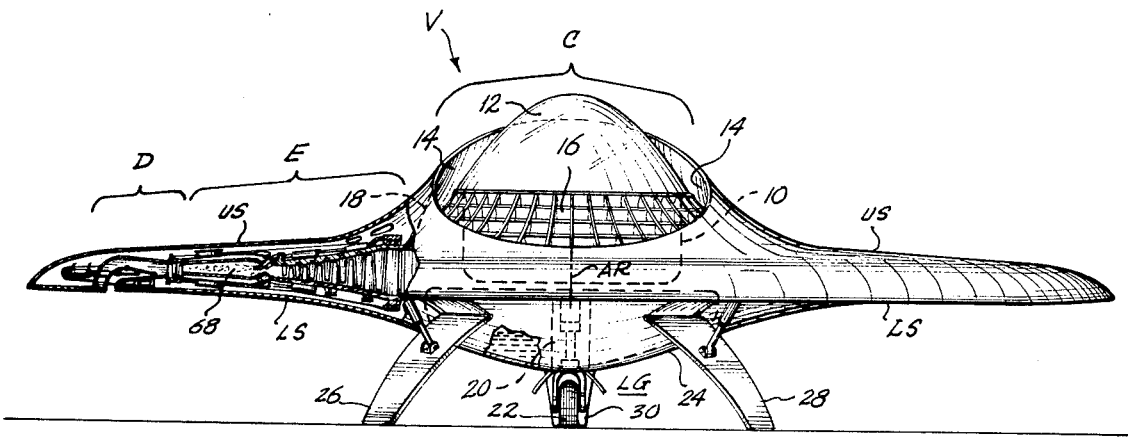
FIG. 3 is a front view of said aircraft in landed attitude, with a portion thereof broken away in radial section through one radial dimension of the engine and control components thereof.
Figure 4:
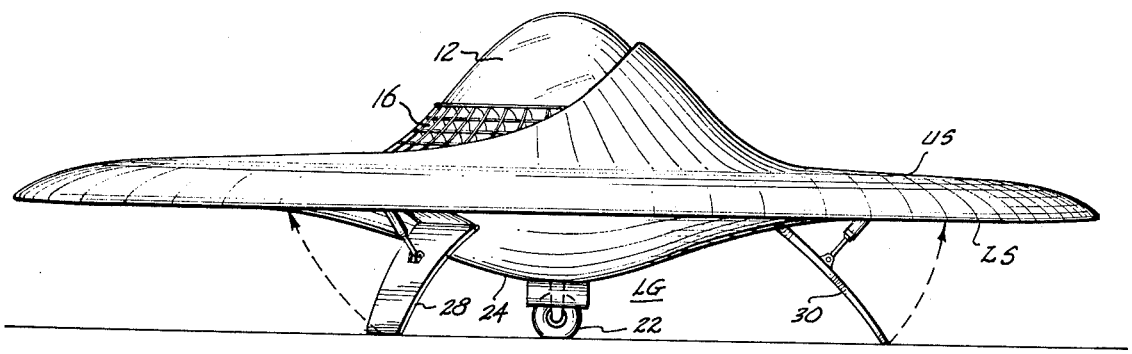
FIG. 4 is a side view of said aircraft.

The radial flow engine E, as best shown in FIGS. 3, 6 and 7, generally comprises a central section C, a compressor section CS, a combustion section FS and a turbine section TS, all in a radial flow relation. The radial flow relationship introduces novel restrictions and advantages as compared to conventional axial flow engines.

With reference to FIG. 3, it can be seen that, in the embodiment of the invention illustrated, the central area C with plenum chamber 14 occupies about forty percent of the radial length of engine E. As will be understood, although the preferred embodiment shows an air intake plenum chamber of about forty percent of the radial length of engine E, other embodiments may involve plenum chamber sizes of somewhat smaller or even larger proportions. A relatively large chamber size is required to prevent engine "choking" (i.e. the inability of the engine to effectively input additional air when air flow mach numbers approach 1.0), and in this respect it is considered that the radial length of the air intake plenum chamber should be at least about one-third the radial length of the engine overall. Additionally, the chamber inlet geometry is such as to allow inlet air to smoothly and continuously to approach and impinge upon the first stage of the compressor CS when inlet air fails to smoothly impinge upon the first stage of the compressor or impinges on the first stage in less than a full compressor blade width, recirculation of inlet air usually occurs resulting in ineffective compressor operation and overheating of the compressor blades.

In the embodiment shown, the compressor CS is of a radial length approximately one-quarter of the radial length of engine E and is characterized by radial geometry with sharply contracting or decreasing radial side wall members 62 and 76. As inlet air is compressed its pressure and density tend to increase with a resulting decrease in velocity. The contracting side walls of the compressor maintain the relative velocity of the compressed air constant as it moves radially away from the chamber 14. With each row of compression blade 64 and 68 in counter-rotation with respect to each other the compression ratio per pair of blade rows is substantially higher than would be expected from a conventional pair of blade rows under the same conditions of air flow mach number from axial type engines.

The combustion chamber FS, in the embodiment illustrated, also occupies approximately one-quarter the radial length of the engine E. The important consideration in this respect is that the combustion chamber be of a sufficient length to ensure complete air-fuel mixture prior to burning. Additionally, the substantially larger cross-sectional area of the combustion chamber 14 downstream from that where the air-fuel mixture entered produces a large volume in which the velocity of the mixture decreases to ensure complete combustion. As shown in FIG. 6 and described below, vortexing of the compressed air and fuel as it enters the combustion chamber assists in the mixture of the two and promotes "flame holding" without which combustion within the chamber could not be self-sustaining.

Turbine TS, in the embodiment shown, occupies less than about five percent of the radial length of the engine E. In conventional axial flow engines the turbines generally have an increasing cross-sectional area, however this requirement is substantially reduced in the radial engine of the present invention due to the naturally increasing cross-sectional area of the radial geometry. Since turbine TS is disposed rear the extreme outboard end of vehicle V and at the outboard end of engine E, blades 72 and 74 are small since blade velocities at such a radial distance from the axis of rotation tend to be high.

Viewed structurally, respective upper and lower rotor elements, generally designated 50, 52, counter-rotate during engine operation between respective relatively stationary upper and lower engine housings 54, 56 about a center or axis of rotation designated diagrammatically in FIGS. 1 and 3 at AR. As will be noted, each of the rotor elements 50, 52 is essentially a symmetrical reversal of the other. Upper rotor 50 is journaled to the stationary frame member 58 in the central section C by means of bearing ring 60 and its portion 62 in compressor section CS mounts a series of compressor blades 64a, 64b—64i. Outboardly of the compressor section CS, the upper rotor element 50 comprises a further wall portion 66 which functions as the upper wall of the combustion chamber 68 of the combustion section FS. Outboardly of the combustion chamber wall portion 66 of rotor 50 is a further annular portion 70 in which is mounted an annular ring of turbine blades, one of which is indicated at 72 in FIGS. 5, 6 and 7, in the turbine section TS of the engine E. Similarly, lower rotor element 52 is journaled to the stationary frame member 58 of the central section C by means of bearing rings 74 and comprises portion 76 in the compressor section CS which mounts successive, annularly disposed series of compressor blades 78a, 78b—78i. Similarly, also, the lower rotor element 52 further comprises an annular portion 80 serving as the lower wall of combustion chamber 68, and in its portion 82 in the turbine section TS mounts an annularly disposed series of turbine blades 84.

For gravitational reasons, the upper rotor element 50 carries the rotating components of the fuel delivery system. More specifically, the fuel system of the engine E comprises a stationary fuel delivery line 90 leading to relatively stationary fuel discharge nozzles 92 which, as best shown in FIG. 8, deliver a fuel spray 92' into an annular fuel manifold made up of stationary walls 94, 96 and rotating walls 98, 100 provided with labrynth seals 102', 104, 106 (FIG. 5) therebetween. One or more vent lines, one of which is indicated at 107 in FIG. 5, provide reduced pressure communication between the annular fuel manifold and an upstream stage of the compressor section CS to provide negative pressure to scavenge fuel vapors. Fuel pickup from the rotating portion of the fuel manifold is by centrifugal flow through manifold fuel lines 108 (FIG. 8) into fuel control units, one of which is shown at 110, wherein the fuel flow is metered or modulated in a manner conventional per se, to meet demand. The fuel output from the control units 110 passes through fuel line 112 to manifold line 114 and from there is distributed to the various nozzles 116 and discharged therefrom into the combustion chamber 68. In a typical design, for example, some sixteen fuel control units 110 may be employed to deliver fuel to a sixty-four unit array of fuel nozzles 116 in the combustion chamber 68.

In the engine configuration shown in FIGS. 5-8, the bottom rotor element 52 carries one or more fuel igniter plugs 120, fired in a manner conventional per se, such as through lead 122 from coil 124, which is energized through contactor and contact ring 126, 128. Lower rotor element 52 also carries an annular ring gear 130, engageable by a starter motor (not shown), which can also serve as a drive gear for accessory units.

Respective annular air bearings are appropriately provided in outboard portions of the engine, such as near the inboard and outboard extremities of the combustion section FS. Thus, for example, as best shown in FIG. 6, inboard annular air bearings 132, 134 are provided between the upper rotor element 50 and upper engine housing 54 and between lower rotor element 52 and lower engine housing 56, respectively, and outboard air bearings 136, 138 are provided in the turbine section TS. As also shown in FIG. 6, pressurized air is suitably supplied to the air bearings, as by venting a portion of the air being delivered to the combustion chamber to the air bearings through respective impact tubes 140, 142 and air passages 144, 146.

Also carried by the respective upper and lower rotor elements 50, 52 are respective annular ferromagnetic rings 148, 150 which function with a plurality (preferably at least four) of opposed electromagnetic coils, two of which are shown in FIG. 6 and designated 152, 154, to provide yaw control. Selective energization of either the upper or lower set of electromagnetic coils 152 or 154 functions to brake the rotation of the corresponding rotor element proportionally to the extent of energization of the electromagnetic coils. Since the upper and lower rotor elements 50, 52 nominally counter-rotate at essentially equal velocities, if one is slowed down by energization of its associated yaw control electromagnetic coils, the resulting differential in rotational speeds of the rotor elements generates a rotational reaction thrust on the vehicle to change its directional heading. In this respect it is notable that such yaw control is entirely independent of aerodynamic factors.

Electrical circuit contact rings 156, 158, 160 and associated contact buttons 162, 164, 166 are arranged between the upper engine frame 54 and upper rotor element 50 and serve as individual electrical circuit connectors, such as for the throttle control signal delivered to the fuel control unit 110, and for a grounding contact or the like.

Air flow to the engine E at cruising speed, as earlier indicated, is by ram pick-up of air by plenum chamber 14 and, in the forward portion of such chamber, through the cascade deflection vanes 16. The chamber 14 is configured to deliver the incoming air into what may be termed an engine air intake region 170 which is occupied by stationary air inlet guide vanes 172 (note FIG. 8) immediately ahead of the first stage compressor blades 64a. As will be understood, the first stage compressor blades and each successive stage of compressor blades 78a, 64b through 64i, 78i, adds additional pressure and energy to the air until the air enters the diffuser zone 174 immediately downstream of the last stage of the compressor section CS. Several advantages of a compressor section with counter-rotating rotors are to be noted. First, all compressor blades are adding energy to the oncoming flow of air since there are no stator blades required to straighten the air flow for each successive stage of compression. Stator blades in axial flow type compressors in fact actually absorb or extract energy in the process of changing air flow direction. Secondly, for a given amount of compression, a much lower rotor rotational speed is required than in conventional axial type compressors since the relative speed between successive stages of compressor blades is nominally twice the speed of rotation of either of the rotors with respect to the associated stationary structure, and since each stage of compression adds energy to the air without intervening absorption of energy by stator means. Thirdly, the high degree of symmetry of the compressor blades, and indeed the whole of the rotating elements of the entire engine, results in little or no net torque being generated. Fourthly, the centrifugal force on the compressor blade tips is very largely offset by the reaction of the blade tips with the incoming air, which acts in the opposite direction. Fifthly, the direction of air flow through the compressor is essentially straight, arriving at the diffuser zone by movement along an essentially radial direction of movement with respect to the axis of rotation AR.

The compressed air in the diffuser zone 174 is in a relatively static state even though enclosed by counter-rotating elements. A small portion of the air is bled directly from the diffuser zone 174 through the gap 176 between the leading edges of the two opposed combustion zone walls 66, 80, for the primary purpose of cooling the fuel manifold 114 and associated nozzles 116. This air then joins the primary air for fuel combustion, which is picked up from the diffuser zone 174 by oppositely rotating turbulating vanes 178, 180 (also note FIG. 8) and enters the combustion chamber through holes interspersed along the combustion chamber walls 66, 80, certain of which holes are shown at 182 in wall 66 and at 184 in wall 80, the directions of air flow in this regard being generally shown by arrow designations in FIG. 6. As will be understood, since air delivery holes 182, 184 are dispersed along most of the radial dimension of the combustion chamber walls 66, 80, there is a progressive delivery of combustion air to the fuel combustion zone. In commonly used fuel combustion parlance, the air entering the relatively inboard region of the combustion zone is the first air combusted or the so-called primary combustion air, the air entering the zone intermediately of the radial dimension thereof is what may be termed intermediate or secondary combustion air, and the air entering the combustion zone most downstream thereof is what may be termed dilution or tertiary combustion air. As earlier indicated, certain portions of this air are also delivered to the impact tubes 140, 142 and air passages 144, 146 to pressurize the respective air bearings 132, 134, 136, 138. It is an advantage of this manner of delivery of air to the combustion chamber 68 that the air flow through the holes 182, 184 in part serves to cool the combustion chamber walls 66, 80 and in part to elongate the flame envelope for more effective and complete combustion of the fuel. It is theorized that the mixing of the fuel and air mixture in the combustion zone 68 is considerably enhanced by reason of the counter-rotating movement of combustion chamber walls 66, 80 as the air is delivered through the holes therein, the oppositely moving air delivery holes 182, 184 in effect providing a mixing action of a spiralling nature of more or less equal turbulence throughout the annular combustion zone and a materially increased loiter or dwell time for the fuel/air mixture. Stated otherwise, the primary air being delivered through the holes 182 in the upper chamber wall 66 has a tangential component of velocity and pressure equal and opposite to the primary air being delivered through the holes 184 of the bottom wall 80, with a vortical motion being generated in the gases throughout the combustion zone.

As will be appreciated, the turbulating vanes 170, 180 not only act as stiffeners along both radial and circumferential vectors with respect to the combustion chamber walls, i.e. as stiffeners in a structural sense, but function as a centrifugal compressor or supercharger for the air being delivered to the combustion zone.

In the combustion chamber as shown in FIGS. 5, 6 and 7, it is also notable that the air not delivered to the combustion zone or to the air bearings by the turbulating vanes 178, 180 is fed through respective upper and lower annular slots 186, 188 to provide cooling throughout the outboard extent of the combustion chamber walls 66, 80 and to the turbine blades 72, 84, and also to the exhausting products of combustion.

In a manner conventional per se, reaction and expansion of the products of combustion as they pass through the blades of the turbine section TS are used to drive the compressor section CS and appropriate accessories (as by ring gear 130). Arranged outboardly of the engine E, generally peripherally of the vehicle is what may be termed a thrust ducting section DS, which in general includes an annular arranged series of selectively controllable lift thrust producing duct means and forward propulsion thrust generating duct means. As will be observed, the duct section DS is a stationary portion of the vehicle in the sense of being nonrotating relative to the central section CS. In that these two sections are in more or less rigid relationship to each other, the duct section DS can readily serve a structural strengthening function with regard to the thrust generating components. In this respect, for example, the duct section DS includes vertical stiffening panels 190 joining with the sheeting forming the upper surface skin US and the outboard portion 192 of the skin forming the lower surface LS, and vertical panels 194, which also serve as certain vertical wall portions of the thrust ducting structure, the other walls of which are essentially provided by upper walls as at 196, lower walls as at 198, and separator walls as at 200.

Vertical stiffening panels are also provided between the engine framing 54, 56 and the respective upper and lower skins US, LS, as at 214, 216.

Deflector vanes 202, pivotally movable by action of respective fluid cylinders 204, serve to selectively deliver the exhaust gases discharging from the turbine section TS through either the annularly arranged series of lift thrust exhaust nozzles 206 or the annularly arranged series of forward thrust exhaust nozzles 208, or both, as determined by the relative position of associated deflector vanes 202. By way of example, FIG. 5 shows a deflector vane 202 in its attitude for maximal delivery of the exhaust gases to the forward thrust exhaust nozzles 208, and FIG. 6 shows such deflector vane 202 in its attitude for delivery of maximal flow of exhaust gases to the lift thrust nozzles 206. In addition, each of the lift thrust exhaust nozzles 206 is provided with a fluid cylinder actuated lift gate valve 210. The lift gate valves 210 are provided at equally spaced locations annularly of the vehicle, such as at four locations, to provide control means for effecting vehicle stability and attitude control during hover and transitional phases of flight. These control functions are accomplished by closing to a selected degree one or more of the gate valves 210, thus creating a sector imbalance in the cylindrical sheet of high pressure gases issuing from the lift thrust exhaust nozzles 206. As will be understood, if the right side of the vehicle drops, for example, the gate valve 210 on the left side can be closed or partially closed, as by selective actuation of fluid cylinder 211, to reduce or cut off a segment of the lift thrust at the left side of the craft, thus creating the necessary corrective force at the right side. Similarly, a quartering correction can be made by actuating two adjacent lift gate valves in a similar manner. As will also be understood, the controlling effect of these lift gate valves is at a maximum during hovering flight and diminishes proportionately as the vehicle transitions to forward aerodynamic flight as determined by the positioning of the exhaust deflection vanes 202. In aerodynamic cruising flight, the spoiler or attitude control surfaces 32-42 constitute the primary control elements.

The forward thrust exhaust nozzles 208 are provided with cascade deflector vanes 212 in fixed, continuous array around the entire annular nozzle array, it being understood that the progressive configurations of these cascade vanes 212 are such that each deflects the downwardly moving exhaust gases moving therethrough in a rearward or primarily rearward direction. It is theorized that the gases emerging from the forward thrust exhaust nozzles 208 will "Coand" along the lower surface skin LS.

In the light of the foregoing discussions of certain structural and operational aspects of the invention, it is to be observed that the craft and engine configuration presented is characterized by the craft in general being annularly symmetrical and relatively thin with aerodynamically clean interfacing between the engine nacelle, wing and fuselage, all three such components, conventionally considered, being essentially the same thing.

Since the radial flow engine presented is relatively quite thin, its use permits a skin configuration having a very low drag profile during forward flight, notwithstanding that the size of the engine is relatively large in terms of its combustion chamber volume. The thin, compact configuration capability of the engine affords a wide range of flexibility in designing and adapting the engine and craft to prescribed vehicle power, load and range requirements. Also, no vertical stabilizers are required for the vehicle because of the internal yaw control components discussed, so that less drag and weight are involved in any given craft design.

The overall efficiency of the engine, in terms of its high thrust to weight ratio, is quite high, in that, with the exception of the combustion zone walls and internal fuel delivery elements, all internal rotating elements are adding or extracting heat and pressure energy. The radial vane stiffeners (turbulating vanes 178, 180) also increase engine efficiency in that the positive compression or supercharging action on the air being delivered to the combustion zone, serves to keep the compressor section "unloaded" and improve the overall air flow characteristics of the engine.

As will also be apparent, the engine is adaptable to so-called "fan" or high-bypass-ratio engine modifications, with appropriate redesign of the engine radial support strut housings to accommodate the bypass fan blades for "fan" type engine operation, in a manner conventional per se.

Since jet engine exhaust noises are caused primarily by the concentrated stream of hot exhaust gases reacting with cooler ambient air, the propulsion duct system of the present invention enables substantial reduction in external noise level because its exhaust gases are emitted in thin, cylindrical sheets of relatively large surface area, making it possible for ambient air to more quickly and effectively mix with and cool the hot exhaust gases over a larger interface area than is the case with the exhaust gases from conventional axial flow type jet engines.

Another type of noise problem encountered with conventional axial flow type jet engines is that of intake "whine". This type of noise phenomenon is much less severe in the radial flow engine of the present invention because of its characteristically lower rpm during operation, and because this type of noise is primarily radiated along the plane of rotation of the rotor means and may be readily suppressed in the present engine by sound absorbent materials placed in the vehicle plenum chamber surrounding the engine.

Although the invention has been described with particular attention to and discussion of a generally circular, disc-type airborne vehicle of the aircraft type, capable of high or low altitude atmospheric flight, it will be readily understood that the invention is also applicable to airborne vehicles which are non-circular in configuration and that certain aspects of the invention, such as the radial flow engine thereof, are readily adaptable to other types of vehicles, such as so-called ground effect machines (GEMs), and even to certain stationary jet engine installations, or otherwise, and to any power generating application where an efficient, symmetrical, thin, annularly configured jet engine, producing relatively large amounts of exhaust products at relatively low engine rpm and at relatively high thrust-to-weight ratios, is desired.

It is theorized that a further advantage of the radial flow engine of the present invention for use in aircraft and the like is that the engine rotor elements inherently provide gyroscopically induced inertial stabilization of the craft (enabling ground maneuverability on a single landing gear wheel, for example), with the rotor generated precessional forces being cancelled or at least minimized by reason of the two rotor elements generating nominally equal and opposite precessional forces relative to one another.

These and other objects, features, advantages and characteristics, and other modifications and applications of the present invention, will be apparent to those skilled in the art to which the invention is addressed, within the scope of the following claims.

What is claimed is:

1. In a disc type airborne vehicle having a central section including a cockpit area, jet engine means annularly surrounding said cockpit area, and thrust ducting means in a duct section annularly surrounding said jet engine means, the improvement wherein said jet engine means is characterized by:
   (a) an annular compressor section having decreasing side wall members in the radial dimension wherein air is compressed under action of a plurality of counter-rotating compressor blades and delivered to an annular diffuser zone;
   (b) air intake means of a radial length at least about one-third the radial length of said engine, disposed within said central section, said air intake means being in constant communication with said compressor section and delivering a supply of air thereto, said supply of air continuously impinging upon the entire width of said plurality of compressor blades;
   (c) an annular combustion chamber including upper and lower counter-rotating combustion chamber walls having air delivery openings therein, with said annular diffuser zone delivering compressed air directly into said combustion chamber and around said counter-rotating combustion chamber walls and into said combustion chamber through said air delivery openings in said counter-rotating combustion chamber walls;
   (d) means for continuously delivering fuel directly into said combustion chamber for admixture therein with the compressed air delivered thereto from said compressor section annular diffuser zone;
   (e) an annular turbine section wherein counter-rotating turbine blades are driven by combustion products exhausting in radial flow from said combustion chamber; and
   (f) means delivering the exhaust gases discharging from said turbine section to said duct section.

2. A vehicle according to claim 1, wherein said engine exhaust gas discharge means comprises a continuous annular array of lift thrust producing duct means and a continuous annular array of forward thrust generating duct means.

3. A vehicle according to claim 2, wherein said array of forward thrust generating duct means is arranged generally adjacent to and outboardly of said array of lift thrust producing duct means.

4. A vehicle according to claim 1, comprising ram type air intake means in said central section.

5. A vehicle according to claim 4, further comprising fuel storage means in said central section.

6. A vehicle according to claim 1, wherein said engine comprises upper and lower nonrotating engine support framing, respectively annularly arranged above and below upper and lower rotor elements each carrying alternately arranged compressor blades and alternately arranged turbine blades, said support framing being rigidly attached to said central section, with air bearing means arranged between each said rotor element and its associated engine support framing.

7. A vehicle according to claim 6, including annular air bearing means situated between said engine support framing and rotor elements at about the inboard and outboard extremities of the combustion wall forming portions of said rotor elements.

8. In a disc type airborne vehicle having a central section including a cockpit area, jet engine means annularly surrounding said cockpit area, and thrust producing means annularly surrounding said jet engine means, the improvement wherein the overall configuration of the vehicle is characterized by convergent upper and lower surfaces extending outwardly to a generally circular peripheral edge with the outboard portion of the said lower surface extending generally radially of the vehicle, said thrust producing means are arranged annularly in said lower surface outboard portion and include a continuous annulus of lift thrust nozzles arranged in and selectively controllable in each of a plurality of sectors, and further include a continuous annulus of forward propulsion thrust nozzles comprising a plurality of cascade deflector vanes in fixed continuous array around said annulus, and control means selectively delivering the exhaust gases from said jet engine means to either or both of said lift thrust duct means and said forward propulsion thrust duct means to exert on the vehicle any desired combination of lift thrust and/or forward propulsion thrust.

9. A vehicle according to claim 8, wherein said control means selectively delivering the exhaust gases to either or both of said lift thrust producing means and forward propulsion thrust producing means comprises fluid actuatable vane means arranged in the exhaust gases flow path.

10. A vehicle according to claim 8, wherein each sector placed lift thrust duct means comprises fluid actuatable gate means for varying the volume of flow of exhaust gases passing through the associated lift thrust duct means in each said sector.

11. An airborne vehicle according to claim 8, wherein said annular array of lift thrust duct means is situated inboardly of said annular array of forward propulsion thrust duct means.

12. A vehicle according to claim 11, wherein each sector placed lift thrust duct means comprises a plurality of fluid actuatable gate means for individually varying the volume of exhaust gases passing through the associated lift thrust duct means in each said sector.

13. A radial flow gas turbine engine, comprising:

(a) an annular compressor section having decreasing side wall members in the radial dimension wherein air is compressed under action of a plurality of counter-rotating compressor blades and delivered to an annular diffuser zone;

(b) air intake means of radial length at least about one-third the radial length of said engine, said air intake means being in constant communication with said compressor section and delivering a supply of air thereto, said supply of air continuously impinging upon the entire width of said plurality of said compressor blades;

(c) an annular combustion chamber including upper and lower counter-rotating combustion chamber walls having air delivery openings therein with said annular diffuser zone delivering compressed air directly into said combustion chamber and around said counter-rotating combustion chamber walls and into said combustion chamber through said air delivery openings in said counter-rotating combustion chamber walls;

(d) means for continuously delivering fuel directly into said combustion chamber for admixture therein with the compressed air delivered from said compressor section annular diffuser zone; and (e) an annular turbine section wherein counter-rotating turbine blades are driven by combustion products exhausting in radial flow from said combustion chamber.

14. An engine according to claim 13, comprising upper and lower rotor elements, each of said rotors carrying alternate compressor blades in said compressor section, one wall of said combustion chamber, and alternate turbine blades in said turbine section.

15. An engine according to claim 14, wherein each rotor element is substantially symmetrical of the other, being essentially the reverse of the other.

16. An engine according to claim 14, wherein said engine further comprises upper and lower nonrotating engine support framing in generally annular arrangement, respectively above and below said upper and lower rotor elements, and air bearing means arranged between each said rotor element and its associated engine support framing.

17. An engine according to claim 16, including annularly arranged air bearing means situated between said engine support framing and rotor elements at about the inboard and outboard extremities of the combustion wall forming portions of said rotor elements.

18. A radial flow gas turbine engine, comprising:
(a) an annular compressor section having decreasing side wall members in the radially axis wherein air is compressed under the action of a plurality of counter-rotating compressor blades;

(b) air intake means of radial length at least about one-third the radial length of said engine, said air intake means being in constant communication with said compressor section and delivering a supply of air thereto, said supply of air continuously impinging upon the entire width of said plurality of compressor blades;

(c) an annular combustion chamber receiving compressed air and radial flow from said compressor section, and including counter-rotating combustion chamber walls;

(d) means for delivering fuel to said combustion chamber for admixture with the compressed air delivered thereto by said compressor section;

(e) an annular turbine section wherein counter-rotating turbine blades are driven by combustion products exhausting in radial flow from said combustion chamber;

(f) upper and lower rotor elements, each of said rotors carrying alternate compressor blades in said compressor section, one wall of said combustion chamber, and alternate turbine blades in said turbine section; and, (g) wherein each of the combustion chamber walls comprises air turbulating vanes arranged on said walls externally of the chamber defined by said walls, with the leading edges of said vanes disposed adjacent to and in air flow communication with the discharge areas of the compressor section, and with the trailing portions thereof extending substantially across the radial dimensions of the combustion chamber wall.

19. An engine according to claim 18, comprising air delivery holes in said combustion chamber walls, and means for delivering air from said compressor section to said combustion chamber through said air delivery holes.

20. A radial flow gas turbine engine, comprising:
(a) an annular compressor section having decreasing side wall members in the radial dimension wherein air is compressed under action of a plurality of counter-rotating compressor blades and delivered to an annular diffuser zone;

(b) air intake means of radial length at least about one-third the radial length of said engine, said air intake means being in constant communication with said compressor section and delivering a supply of air thereto, said supply of air continuously impinging upon the entire width of said plurality of compressor blades;

(c) an annular combustion chamber including upper and lower counter-rotating combustion chamber walls having air delivery openings therein with said annular diffuser zone delivering compressed air directly into said combustion chamber and around said counter-rotating combustion chamber walls and into said combustion chamber through said air delivery openings in said counter-rotating combustion chamber walls;

(d) an annular turbine section having counter-rotating turbine blades driven by combustion products exhausting in radial flow from said combustion chamber;

(e) upper and lower rotor elements, each of said rotors carrying alternate compressor blades in said compressor section, one of said counter-rotating combustion chamber walls and alternate turbine blades in said turbine section; and, (f) means for continuously delivering fuel directly into said combustion chamber for admixture therein with the compressed air delivered thereto from said compressor section annular diffuser zone comprising annular manifolding having stationary and rotor wall portions said rotor wall portions being carried by said upper rotor element inboardly of said combustion chamber.

21. A radial flow gas turbine engine, comprising:
(a) an annular compressor section having decreasing side wall members in the radial axis wherein air is compressed under the action of a plurality of counter-rotating compressor blades;

(b) air intake means of radial length at least about one-third the radial length of said engine, said air intake means being in constant communication with said compressor section and delivering a supply of air thereto, said supply of air continuously impining upon the entire width of said plurality of compressor blades;

(c) an annular combustion chamber receiving compressed air and radial flow from said compressor section, and including counter-rotating combustion chamber walls;

(d) means for delivering fuel to said combustion chamber for admixture with the compressed air delivered thereto by said compressor section;

(e) an annular turbine section wherein counter-rotating turbine blades are driven by combustion products exhausting in radial flow from said combustion chamber;

(f) upper and lower rotor elements, each of said rotors carrying alternate compressor blades in said compressor section, one wall of said combustion chamber, and alternate turbine blades and said turbine section; and, (g) air delivery holes in said combustion chamber walls, and means for delivering air from said compressor section to said combustion chamber through said air delivery holes comprising turbulating vanes carried by said combustion chamber walls and configured to further pressurize the air being delivered to said air delivery holes.

22. An engine according to claim 21, further comprising air bearing means situated near the combustion chamber discharge region, said turbulating vanes in part functioning to additionally pressurize the air delivered to said air bearing means.

23. A radial flow gas turbine engine having an annular compressor section within an annular combustion section in turn arranged within an annular turbine section, said engine comprising:

(a) a non-rotary central section encircled by said compressor section and including air intake means and fuel supply means;

(b) counter-rotating upper and lower rotor elements journaled for rotation about said central section and each carrying
  (1) alternately arranged compressor blades in said compressor section,
  (2) a combustion chamber wall in said combustion section, and
  (3) alternately arranged turbine blade means in said turbine section;

(c) non-rotary upper and lower engine support framing respectively annularly disposed above and below said upper and lower rotor elements;

(d) fuel delivery means between said central section and the combustion chamber defined by such combustion chamber walls, and including annular fuel manifold means receiving fuel from said fuel supply means, said fuel manifold means being in part arranged in fixed relationship with respect to one of such engine support framing means and in part carried by the rotor element support thereby; and, (e) vent means interconnected between said fuel manifold means and an upstream stage of said compressor section and providing reduced pressure in said fuel manifold means to scavenge fuel vapor therefrom.

24. A radial flow gas turbine engine according to claim 23, wherein said fuel delivery means comprises a plurality of fuel control units carried by one of said rotor elements and receiving fuel from the annular fuel manifold, and delivering such fuel to a plurality of fuel injection nozzles arranged in annular array in said combustion chamber.

25. A radial flow gas turbine engine according to claim 24, wherein one of said rotor elements is the upper rotor element.

26. A disc type airborne vehicle including engine means according to claim 25, and comprises a cockpit area in said central section, and thrust ducting means through which exhaust gases from said turbine section discharge.

27. A disc type airborne vehicle including engine means according to claim 23, and comprising a cockpit area in said central section, and thrust ducting means through which exhaust gases from said turbine section discharge.

* * * * *